(No Model.) 2 Sheets—Sheet 1.
J. W. DENNO.
FASTENING FOR BOOTS, SHOES, CORSETS, &c.
No. 585,655. Patented July 6, 1897.
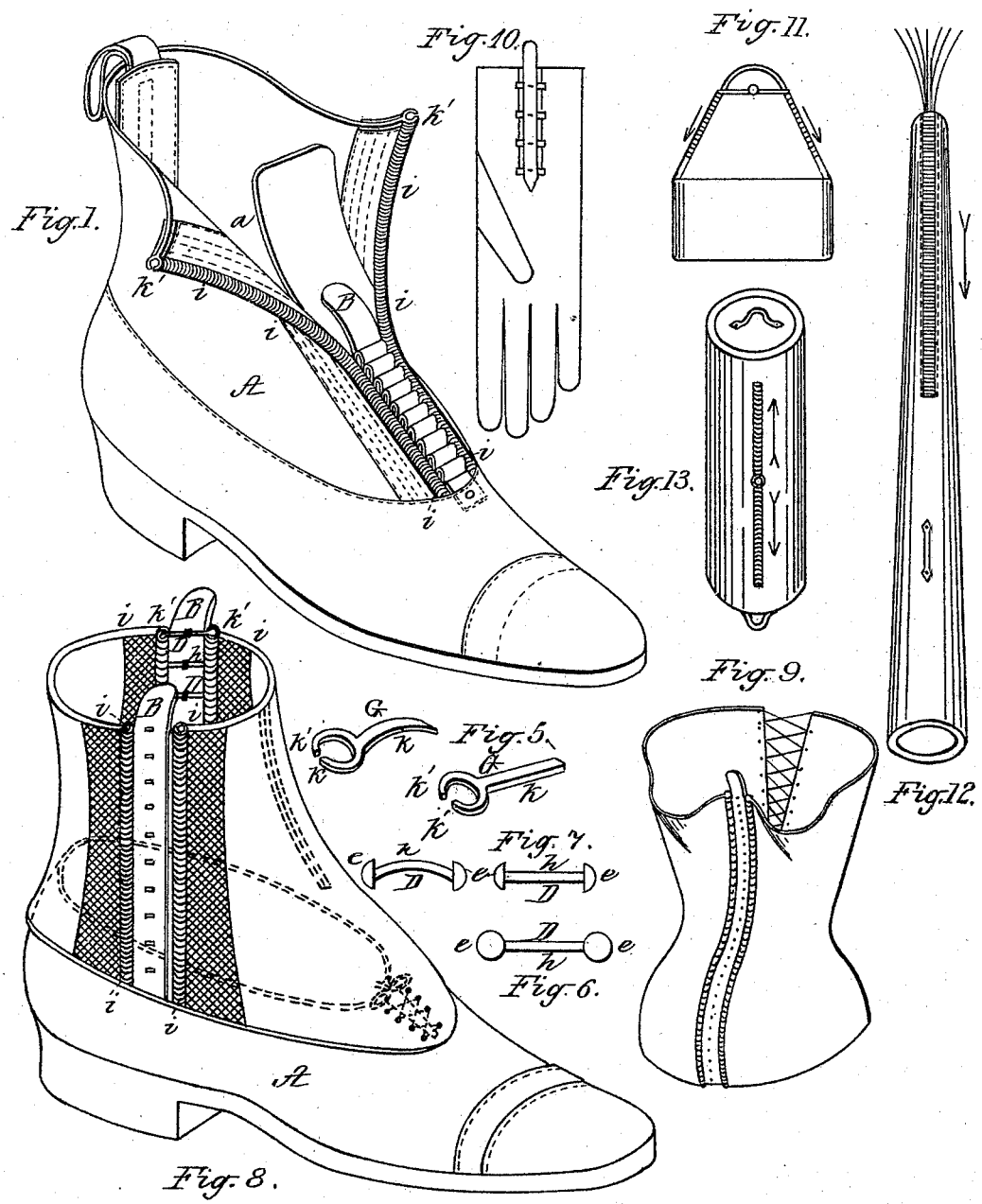
WITNESSES,
A. B. Diggs
A. F. Stearns
INVENTOR,
John W. Denno,
pr N. W. Stearns, Attorney.

(No Model.) 2 Sheets—Sheet 2.
J. W. DENNO.
FASTENING FOR BOOTS, SHOES, CORSETS, &c.
No. 585,655. Patented July 6, 1897.
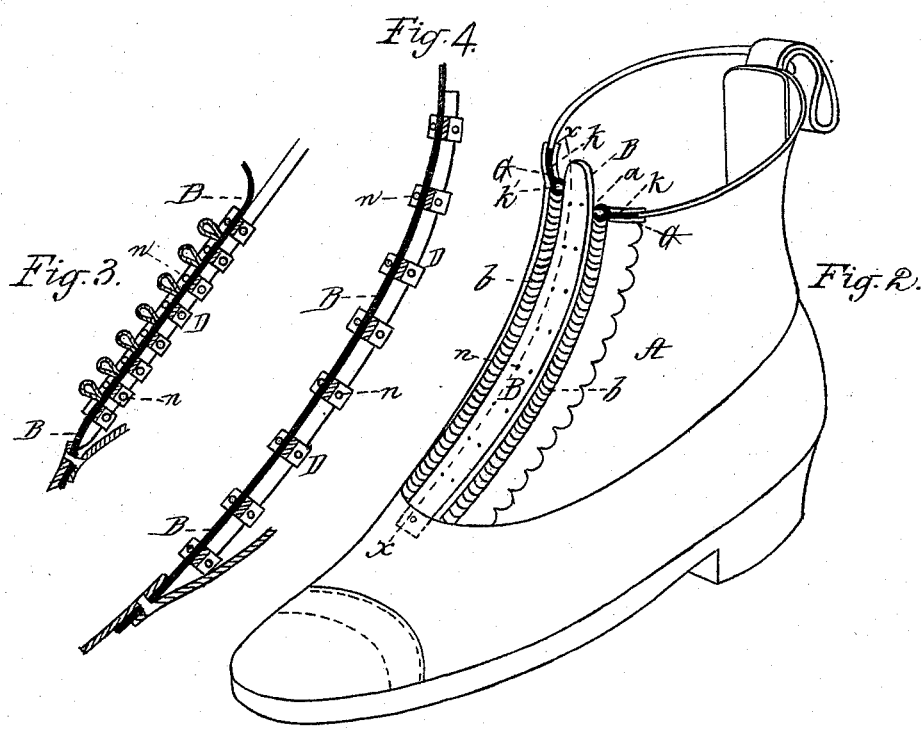
Witnesses,
A. L. Stearns
Frederick Taschen
Inventor,
John W. Denno,
pr N. W. Stearns,
Atty

UNITED STATES PATENT OFFICE.

JOHN W. DENNO, OF BOSTON, MASSACHUSETTS, ASSIGNOR TO FRANK P. COX, OF MALDEN, MASSACHUSETTS.

FASTENING FOR BOOTS, SHOES, CORSETS, &c.

SPECIFICATION forming part of Letters Patent No. 585,655, dated July 6, 1897.

Application filed January 18, 1896. Serial No. 576,005. (No model.)

*To all whom it may concern:*

Be it known that I, JOHN W. DENNO, of Boston, Suffolk county, Massachusetts, have invented certain Improvements in Fastenings for Boots, Shoes, Gaiters, Corsets, Gloves, and other Articles, of which the following is a full, clear, and exact description, reference being had to the accompanying drawings, making part of this specification, in which—

Figure 1 represents a shoe having applied to its instep-opening a fastening constructed in accordance with my present invention, said instep being open. Fig. 2 represents the shoe with its instep closed; Fig. 3, a section on line $w$ $w$ of Fig. 1, enlarged; Fig. 4, an enlarged section on line $x$ $x$ of Fig. 2. Fig. 5 represents, enlarged, one of the bifurcated pieces which collectively constitute the hollow guides or channels shown in Fig. 1. Figs. 6 and 7 represent, enlarged, forms of transverse clips having rounded projections united by interposed straight or curved shank portions; Fig. 8, the upper portion of an overgaiter having its sides closed by my improved fastening. Figs. 9, 10, 11, 12, and 13 respectively represent a corset, glove, hand-bag, whip-bag, and mail-pouch closed by my fastening.

This invention has for its object to provide a desirable, practical, and reliable fastening as a substitute for buttons, hooks, elastic webbing, lacing, and other devices usually employed for securing boots, shoes, gaiters, corsets, gloves, and other articles in place; and my present invention relates particularly to that class of fastenings in which a movable tongue or band is provided with a series of transverse devices which engage with guides formed at the opposite sides of the opening in the article to be closed or fastened; and my invention consists in a pair of open or hollow guides or channels at the opposite sides of the opening to be closed, in combination with a flexible band or tongue and a series of transverse clips, each having a pair of rounded, ball-shaped or other projections connected by an interposed shank, to which the band is permanently secured, each of the aforesaid hollow guides being formed of a series of devices arranged side by side, each composed of a shank with bifurcations only at one end (its outer end) and secured in place between the edge of the "upper" or other article and its stay or lining in such manner that although said guiding devices are individually separate from each other, in order that the guide may be endowed with the necessary flexibility to conform to the natural movements and bending of the instep of the foot or other portion of the body or thing inclosed thereby, the bifurcated guide-pieces collectively forming a continuous channel, groove, or guideway for the smooth and unobstructed passage of the projections of the transverse clips therein, the act of fastening or closing the opening by my closure device being conveniently performed by simply drawing the band through the opening, while the act of unfastening or disclosing the opening is effected by pressing the transverse clips down (or other direction, as the case may be) close together until they are collected at the opposite end of the opening with the folds of the closure band or tongue gathered between them, whereby the necessity of drawing it down below, away from, out of, or beyond the opening incident to other fasteners of this class and the objections thereto are avoided.

In Figs. 1 and 2 of said drawings, A represents a shoe having a central opening $a$ at its instep, each of the opposite sides or edges of which is provided with a continuous channel, groove, or guideway $b$, composed of a series of short clips G, arranged side by side and being formed of a straight or curved shank portion $k$, terminating at its outer end only with a pair of bifurcations $k'$ $k'$, Fig. 5, said clips G being secured by stitching or otherwise in place between the edges of the upper and its stay or lining, the whole collectively forming a continuous open cylindrical path or-way $b$, which, while possessing adequate firmness, is endowed with the necessary flexibility to bend and conform to the various movements of the instep of the foot when the shoe is located thereon. Within this instep-opening is fitted a band or tongue B, of leather or other suitable material, preferably sewed to the upper at the lower end of said opening. The width of this flexible band is about the width of the opening, and sewed or riveted to the under side of said band at intervals are a series of transverse clips D, of the form seen in Figs. 6 and 7, each having a pair of ball-shape or rounded projections e, connected by an interposed straight or curved shank h, said clips serving to connect the two opposite guides b b.

The interposed shank h is provided with two or more perforations n n, Figs. 6 and 7, through which passes the thread or rivets used in securing the clips to the band, or this middle shank portion h need not be perforated and the stitches or other fastening be carried around instead of through it. The length of this band may be a trifle greater than that of the instep-opening, so that when the opening is closed, as seen in Fig. 2, the upper end may extend a short distance above the opening, and when the band is down serves as a convenient means by which the fingers may be applied to draw the band up from the position seen in Fig. 1 to close the opening, as seen in Fig. 2, when the shoe is on the foot, the act of slightly pulling or drawing up on the said band causing the several clips to successively slide smoothly up within the guides b, thus instantly closing the opening a and securing the shoe in an easy position on the foot, the arrangement and location of the clips and band being more clearly seen in the enlarged section, Fig. 4.

When the shoe is on the foot and is to be unfastened ready for removal, it is only necessary to press gently with the thumb down on the upper clip, which thereby slides down and causes the other clips in succession to slide down in the guides b b, with the band B gathered in neat folds between them, till the instep-opening is revealed or disclosed, as seen in Fig. 1, the position of the clips and interposed folds being more clearly seen in the enlarged section, Fig. 3.

My improved fastening may be conveniently applied to various things, objects, or articles of wear—for instance, to gaiter-shoes or overgaiters, Fig. 8, or to corsets, Fig. 9, gloves, Fig. 10, hand-bags, Fig. 11, whip-bags for traveling salesmen, Fig. 12, mail-pouches, Fig. 13, also leggings for bicycle-suits, covers for trunks, seats, cushions, carriage-tops, gun-carriages, and numerous other objects or things having openings to be controlled by a fastening.

I claim—

A fastening of the class described, consisting of a flexible band or tongue having secured thereto a series of transverse clips, each composed of a pair of rounded, ball-shaped or other projections connected by an interposed straight or curved shank, in combination with a pair of hollow guides formed of a series of devices, each having a shank with bifurcations only at its inner end or that contiguous to the opening; the bifurcated devices being arranged side by side, and secured between the upper or other article and its stay or lining, in such manner that the guide is endowed with the necessary flexibility to conform to the natural movements of the foot or other portion of the body or thing inclosed thereby, the bifurcated guide-pieces forming collectively a continuous channel, groove or guideway for the unobstructed passage of the projections of the clips therein, all constructed and arranged to operate substantially as described.

Witness my hand this 2d day of January, A. D. 1896.

JOHN W. DENNO.

In presence of—
CHARLES M. BRUCE,
ALBERT W. LYON.